United States Patent
Son et al.

(10) Patent No.: US 10,164,902 B2
(45) Date of Patent: Dec. 25, 2018

(54) RESOURCE ALLOCATION METHOD USING CLOUD API KEY AND APPARATUS THEREFOR

(71) Applicant: KT CORPORATION, Gyeonggi-do (KR)

(72) Inventors: Ju-Wook Son, Gyeonggi-do (KR); Han-Kyu Choi, Seoul (KR); Wan-Pyo Hong, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 95 days.

(21) Appl. No.: 14/771,043

(22) PCT Filed: Sep. 22, 2014

(86) PCT No.: PCT/KR2014/008777
§ 371 (c)(1),
(2) Date: Aug. 27, 2015

(87) PCT Pub. No.: WO2016/047814
PCT Pub. Date: Mar. 31, 2016

(65) Prior Publication Data
US 2016/0173411 A1 Jun. 16, 2016

(51) Int. Cl.
*G06F 13/00* (2006.01)
*H04L 12/911* (2013.01)
*G06F 9/50* (2006.01)

(52) U.S. Cl.
CPC .......... *H04L 47/822* (2013.01); *G06F 9/5011* (2013.01); *H04L 47/823* (2013.01)

(58) Field of Classification Search
CPC .... H04L 47/822; H04L 47/823; G06F 9/5011; G06F 9/50; G06F 9/5072; G06F 9/5027
USPC ......... 709/226, 225, 223, 220–222; 718/104, 718/102, 100
See application file for complete search history.

(56) References Cited

U.S. PATENT DOCUMENTS

| | | | |
|---|---|---|---|
| 8,981,938 B2* | 3/2015 | H. Kazerouni | .... G08B 13/1427 340/568.1 |
| 9,027,108 B2* | 5/2015 | Tan | ....................... G06F 21/606 726/9 |
| 9,366,746 B2* | 6/2016 | Kazerouni | ......... G08B 13/1427 |

(Continued)

FOREIGN PATENT DOCUMENTS

| | | |
|---|---|---|
| JP | 2005-056201 A | 3/2005 |
| JP | 2005-534116 A | 11/2005 |

(Continued)

*Primary Examiner* — Kenneth R Coulter
(74) *Attorney, Agent, or Firm* — IP Legal Services, LLC (57) ABSTRACT

The present disclosure relates to allocating a resource in a cloud computing system to a task using multiple cloud application programming interface (API) keys that allow an access to the cloud computing system. An allocation method includes receiving a request for a task from the client terminal, determining a resource amount necessary for the task, selecting multiple cloud API keys for allocation of the determined resource amount, requesting resource allocation corresponding to the determined resource amount to the cloud computing system using the selected multiple cloud API keys, and being allocated with a resource in the cloud computing system, and executing the task requested from the client terminal using the allocated cloud resource.

14 Claims, 4 Drawing Sheets

(56) References Cited

U.S. PATENT DOCUMENTS

| | | | |
|---|---|---|---|
| 2005/0246705 A1 | 11/2005 | Etelson et al. | |
| 2007/0203959 A1 | 8/2007 | Cho | |
| 2012/0210436 A1* | 8/2012 | Rouse | G06F 21/125 726/26 |
| 2013/0332723 A1* | 12/2013 | Tan | G06F 21/606 713/150 |
| 2015/0219743 A1* | 8/2015 | Kazerouni | G08B 13/1427 340/539.13 |
| 2016/0292980 A1* | 10/2016 | H. Kazerouni | G08B 13/1427 |

FOREIGN PATENT DOCUMENTS

| | | |
|---|---|---|
| KR | 10-2007-0088099 A | 8/2007 |
| KR | 10-2012-0069400 A | 6/2012 |
| KR | 10-2014-0117965 A | 10/2014 |

\* cited by examiner

| Key ID | AVAILABLE RESOURCE AMOUNT | RESOURCE AMOUNT BEING ALLOCATED | MAXIMUM RESOURCE AMOUNT |
|---|---|---|---|
| Key 1 | VM:10, DISK:100G | VM:11, DISK:100G | VM:21, DISK:210G |
| Key 2 | VM:12, DISK:50G | VM:9, DISK:150G | VM:21, DISK:210G |
| Key 3 | VM:5, DISK:30G | VM:5, DISK:50G | VM:10, DISK:80G |
| ⋮ | | | |

RESOURCE ALLOCATION METHOD USING CLOUD API KEY AND APPARATUS THEREFOR

CROSS REFERENCE TO RELATED APPLICATIONS

This application is a National Stage Patent Application of PCT International Patent Application No. PCT/KR2014/008777 (filed on Sep. 22, 2014) under 35 U.S.C. § 371, the teaching of which is incorporated herein in its entirety by reference.

TECHNICAL FIELD

The present disclosure relates to technology for allocating resources in cloud computing systems, and more particularly, to a resource allocation method for allocating a resource of a cloud computing system to tasks using multiple cloud application programming interface (API) keys that allow an access to the cloud computing system and an apparatus therefor.

BACKGROUND ART

Cloud computing refers to a computer environment that allows information technology (IT) devices to store files, to download files, or to process tasks using server resources. Such IT devices may include desktop computers, tablet computers, laptop computers, netbook computers, and smartphones Using such cloud computing technology, cloud services have been introduced and provided. For example, cloud service providers implement systems to allow users to use virtual cloud resources and provide the users with various cloud services. Many methods have been introduced for providing a cloud service for providing a new communication channel.

On the other hand, most cloud service providers provide users with cloud open application programming interfaces (APIs) to allow the users to use cloud resources by an automated method through programs created by the users themselves. Furthermore, cloud service providers issue a cloud API key to each user account. Could service providers receives task commands from users through the issued cloud API key and allocate cloud resources to the tasks.

However, cloud service providers do not provide users with an unlimited amount of cloud resources. Could service providers limit an amount of available cloud resources less than a predetermined level through such cloud API keys. However, this resource usage limit policy for cloud services disallows large scale tasks. For example, a genome analysis task requires large scale resource allocation. task A user cannot run such a large scale task such as the genome analysis task through a cloud computing system because the cloud computing system limits resource allocation task according to the resource usage limit policy.

DISCLOSURE

Technical Problem

The present disclosure is designed to solve the problem of the related art, and therefore the present disclosure is directed to providing a resource allocation method for allocating a resource in a cloud computing system to a task using multiple cloud application programming interface (API) keys to process a large scale task on the cloud computing system having a limit on resources, and an apparatus therefor.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

To achieve the object, according to a first aspect of the present disclosure, there is provided a method for allocating, by a resource management apparatus, a resource to a task requested from a client terminal using multiple cloud application programming interface (API) keys for allocation of resources in a cloud computing system, including receiving a request for a task from the client terminal, determining a resource amount necessary for the job, selecting multiple cloud API keys for allocation of the determined resource amount, requesting resource allocation corresponding to the determined resource amount to the cloud computing system using the selected multiple cloud API keys, and being allocated with a resource in the cloud computing system, and executing the task requested from the client terminal using the allocated cloud resource.

Preferably, the selecting may include selecting multiple cloud API keys for allocation of the determined resource amount by referring to a table including an allocable resource amount for each of a plurality of cloud API keys provided from the cloud computing system.

More preferably, the selecting may include determining whether it is possible to allocate the determined resource amount through one cloud API key by referring to the table, and selecting one or multiple cloud API key as a cloud API key for allocation of the determined resource amount based on a result of the determination.

In this instance, the determining may include determining at least one of a number of virtual machines, an amount of disk space, Internet Protocol (IP) usage, memory usage, and Central Processing Unit (CPU) usage, as the resource amount necessary for the job. Further, the determining may include analyzing a type of the job, and determining the resource amount necessary for the task based on the analyzed type of the job.

To achieve the object, according to a second aspect of the present disclosure, there is provided a resource allocation apparatus including a storage unit to store a table including an allocable resource amount for each of a plurality of cloud API keys provided from a cloud computing system, a receiving unit to receive a request for a task from the client terminal, a task analysis unit to determine a resource amount necessary for the job, a key selection unit to search for multiple cloud API keys for allocation of the resource amount determined by the task analysis unit in the table of the storage unit, and select the found multiple cloud API keys as a cloud API key for allocation of the determined resource amount, and a task processing unit to be allocated with a resource corresponding to the determined resource amount from the cloud computing system using the selected multiple cloud API keys, and execute the task requested from the client terminal using the allocated resource in the cloud computing system.

Advantageous Effects

The present disclosure selects, in response to a request for a task from a client terminal, at least one cloud application programming interface (API) key according to a resource amount necessary for the task, and allows the processing of the task based on the selected cloud API key, and accordingly, even though a resource limit policy is set to a cloud computing system, a large scale task may be processed through the cloud computing system.

Further, the present disclosure may efficiently manage the resources in the cloud computing system by continuously using cloud API keys having available and allocable resource amounts.

Also, the present disclosure runs a task by use of multiple cloud API keys, thereby inducing distributed processing of the task and reducing a load on the cloud computing system.

BRIEF DESCRIPTION OF THE DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawings.

BEST MODE FOR CARRYING OUT THE INVENTION

The foregoing objects, features, and advantages will become apparent from the following detailed description with reference to the accompanying drawings, and accordingly, those skilled in the art will be able to easily practice the technical aspects of the present disclosure. Also, in the description of the present disclosure, when it is deemed that certain detailed description of known technology related to the present disclosure may unnecessarily obscure the essence of the disclosure, its detailed description is omitted herein. Hereinafter, an exemplary embodiment of the present disclosure is described in detail with reference to the accompanying drawings.

Throughout the specification, unless otherwise defined, the term "comprising" as used herein specifies the presence of stated components, but do not preclude the presence or addition of one or more components. Furthermore, it should be understood that the term " . . . unit", "module", or the like as used herein is intended to refer to a processing unit of at least one function or operation, and may be implemented in either hardware, a combination of hardware and software, or software.

Figure 1:
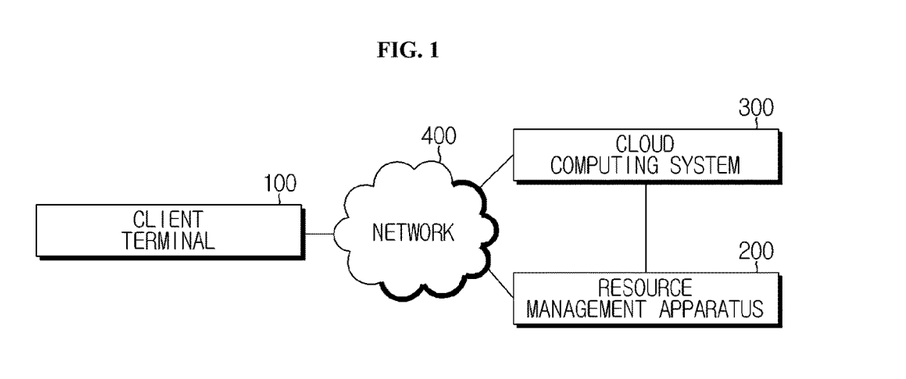
FIG. 1 is a diagram illustrating architecture of a resource allocation system for allocating a resource to a requested task using a cloud application programming interface (API) key according to an exemplary embodiment of the present disclosure.

FIG. 1 is a diagram illustrating architecture of a resource allocation system for allocating a resource to a requested task using a cloud application programming interface (API) key according to an exemplary embodiment of the present disclosure.

As shown in FIG. 1, the resource allocation system according to an exemplary embodiment of the present disclosure includes a resource management apparatus 200 and a cloud computing system 300.

Each of the client terminal 100, the cloud computing system 300, and the resource management apparatus 200 communicates with each other via a network 400. The network 400 includes a mobile communication network and a broadband wired communication network. In the present disclosure, it corresponds to technology known in the art and a detailed description is thus omitted herein. Also, the cloud computing system 300 and the resource management apparatus 200 may make direct communications through a dedicated line.

The client terminal 100 is a terminal possessed by a user. The client terminal 100 is allocated with resources in the cloud computing system 300 through the resource management apparatus 200 and processes the task using the resources in the cloud computing system 300, not in the client terminal 100. Preferably, the client terminal 100 transmits a task request message including information necessary for the task, i.e., a task processing command, a storage location of target data, and a storage location of a task processing result, to the resource management apparatus 200. The client terminal 100 includes desktop computers, tablet computers, laptop computers, netbook computers, and smartphones, and is not limited to a particular type if it is a device capable of communicating with each of the resource management apparatus 200 and the cloud computing system 300 via the network 400.

The cloud computing system 300 is a system which provides users with cloud services using its resources. The cloud computing system 300 includes a plurality of cloud service servers and storage in which data is stored.

Particularly, the cloud computing system 300 analyzes and processes a task requested from a user, interworking with the resource management apparatus 200. Specifically, the cloud computing system 300 provides a plurality of cloud API keys to the resource management apparatus 200. When the resource management apparatus 200 requests resource allocation, the cloud computing system 300 allocates a corresponding resource based on the cloud API keys and processes a task requested from the resource management apparatus 200 through the resource. The cloud API keys are a sort of authentication information for allocation of resources in the cloud computing system 300. The cloud computing system 300 limits a resource amount allocable to a cloud API key. Also, the cloud computing system 300 provides a plurality of cloud API keys to the resource management apparatus 200.

The cloud computing system 300 may be built for each provider. In this case, each cloud computing system 300 communicates with the resource management apparatus 200 and each provides a plurality of cloud API keys to the resource management apparatus 200.

In response to a request for a task from the client terminal 100, the resource management apparatus 200 is allocated with a resource from the cloud computing system 300 using at least one cloud API key so that the task may be performed through the allocated resource.

Figure 2:
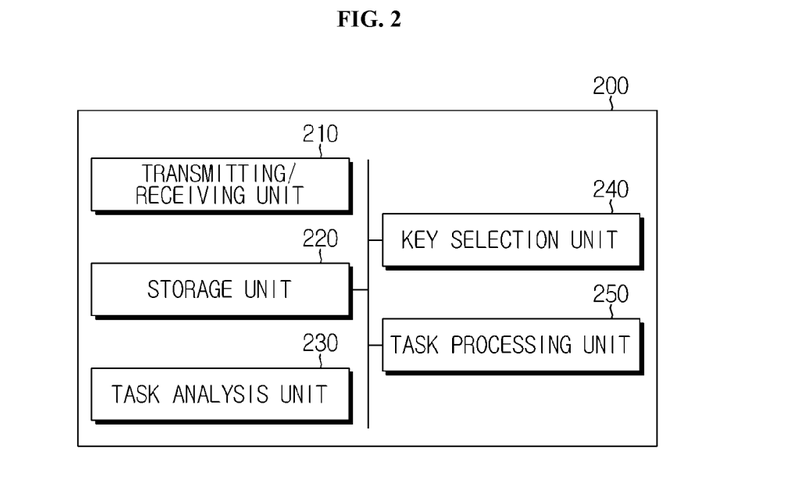
FIG. 2 is a diagram illustrating components of a resource management apparatus according to an exemplary embodiment of the present disclosure.

FIG. 2 is a diagram illustrating components of a resource management apparatus according to an exemplary embodiment of the present disclosure.

As shown in FIG. 2, the resource management apparatus 200 according to an exemplary embodiment of the present disclosure includes a transmitting/receiving unit 210, a storage unit 220, a task analysis unit 230, a key selection unit 240, and a task processing unit 250.

The transmitting/receiving unit 210 may perform a function of communicating with each of the client terminal 100 and the cloud computing system 300 via the network 400. Particularly, the transmitting/receiving unit 210 receives a task request message from the client terminal 100.

The storage unit 220 stores a key management table including resource amount information for each of a plurality of cloud API keys provided from the cloud computing system 300.

Figure 3:
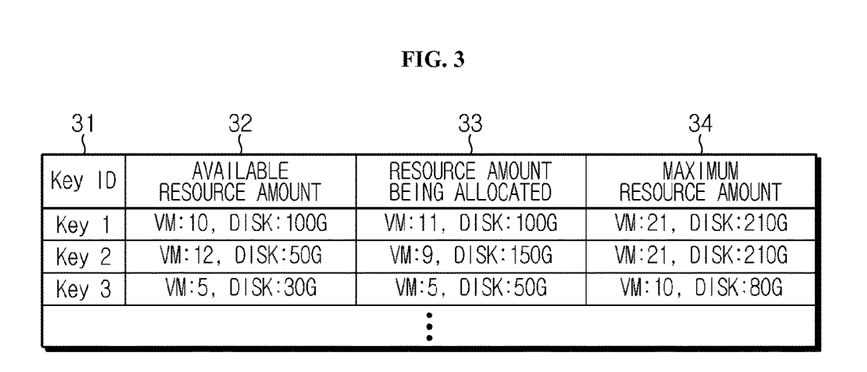
FIG. 3 is a diagram illustrating a key management table according to an exemplary embodiment of the present disclosure.

FIG. 3 is a diagram illustrating a key management table according to an exemplary embodiment of the present disclosure.

Referring to FIG. 3, the key management table includes a key ID field 31, an available resource amount field 32, a resource amount being allocated field 33, and a maximum resource amount field 34.

The key ID field 31 includes identification information of respective cloud API keys provided from the cloud computing system 300. Also, the available resource amount field 32 includes available resource amount information of respective cloud API keys, which can be allocated from the cloud computing system 300 using the corresponding cloud API keys. Furthermore, the resource amount being allocated field 33 includes information on an amount of resources already being allocated from the cloud computing system 300 using the corresponding cloud API keys. Also, the maximum resource amount field 34 includes information on a maximum resource amount allocable from the cloud computing system 300 using the respective cloud API keys. The maximum resource amount field 34 may include information on a maximum resource amount substantially allocable through the respective cloud API keys, or information on a policy-based resource amount corresponding to a result of deducing a predetermined percent (for example, 30%) from a maximum resource amount.

As shown in FIG. 3, the key management table includes information associated with the number of virtual machines (VMs) and an amount of disk space, as resource amount information, in the available resource amount field 32, the resource amount being allocated field 33, and the maximum resource amount field 34. However, the present embodiment is not limited thereto. For example, the key management table may include information associated with Central Processing Unit (CPU) usage, memory usage, and the number of Internet Protocols (IPs) in each of the available resource amount field 32, the resource amount being allocated field 33, and the maximum resource amount field 34.

When the task request message is received from the client terminal 100 through the transmitting/receiving unit 210, the task analysis unit 230 performs a function of analyzing a resource amount in the cloud computing system 300 necessary for the task requested from the client terminal 100. That is, when a task is requested from the client terminal 100 through the transmitting/receiving unit 210, the task analysis unit 230 analyzes the task and determines a resource amount in the cloud computing system 300 to be inputted to the job. In this instance, the task analysis unit 230 identifies a type of the task by analyzing the task processing command included in the task request message, and determines a resource amount in the cloud computing system 300 necessary for the task based on the type of the job.

The key selection unit 240 performs a function of selecting at least one cloud API key for allocation of the necessary resource amount determined by the task analysis unit 230. Specifically, the key selection unit 240 selects at least one cloud API key for allocation of the necessary resource amount analyzed by the task analysis unit 230 as a cloud API key of the client terminal 100, and transmits the selected at least one cloud API key to the task processing unit 250 to process the requested task based on the cloud API key. Preferably, when it is possible to allocate the necessary resource amount through one cloud API key, the key selection unit 240 selects a cloud API key covering the necessary resource amount as a cloud API key of the client terminal 100. In contrast, if it is impossible to allocate the necessary resource amount through one cloud API key, the key selection unit 240 selects multiple cloud API keys covering the necessary resource amount as a cloud API key of the client terminal 100.

When the plurality of cloud API keys is provided from the cloud computing system 300, the key selection unit 240 records identification information of each cloud API key in the key ID field 31 and maximum resource amount information allocable through the cloud API keys in the maximum resource amount field 34. Preferably, the key selection unit 240 may record, in the maximum resource amount field 34, a maximum available resource amount calculated by applying a policy-based limit to a resource amount available from the cloud computing system 300. For example, 30 VMs and 300 GB of disk space may be allocated through a cloud API key having identification information of 'Key1', but for better task processing, the key selection unit 240 may set 70% of the resource amount, i.e., 21 VMs and 210 GB of disk space as a maximum available resource amount and record it in the maximum resource amount field 34.

When the at least one cloud API key is transmitted from the key selection unit 240, the task processing unit 250 is allocated, from the cloud computing system 300, resources corresponding to the necessary resource amount determined by the task analysis unit 230 using the transmitted at least one API key. The task processing unit 250 executes the task requested from the client terminal 100 using the resources in the cloud computing system 300. In this instance, upon receiving the at least one cloud API key, the task processing unit 250 requests resource allocation to the cloud computing system 300 using each cloud API key. Further, the task processing unit 250 transmits the information necessary for the task in the task request message received from the client terminal 100 (i.e., a task processing command, a storage location of target data, and a storage location of a task processing result) to the cloud computing system 300 from which the resource was allocated, to induce the task to be processed on the cloud computing system 300 based on the information.

Also, when resource allocation from the cloud computing system 300 is done using the at least one cloud API key selected by the key selection unit 240, the task processing unit 250 updates the key management table of the storage unit 220 to reflect changed information associated with the resource amount information being allocated and the available resource amount information mapped to the identification information of the selected at least one cloud API. Further, when the task is completed on the cloud computing system 300 and the resource allocated to the task is returned, the task processing unit 250 updates data in the key management table of the storage unit 220 to reflect changed information associated with the returned resource. That is, the task processing unit 250 identifies the cloud API key used to allocate the returned resource and updates data of the available resource amount field 32 and the resource amount being allocated field 33 in the key management table mapped to the identification information of the cloud API key, in order to restore the key management table of the storage unit 220 to a state before the resource allocation.

Figure 4:
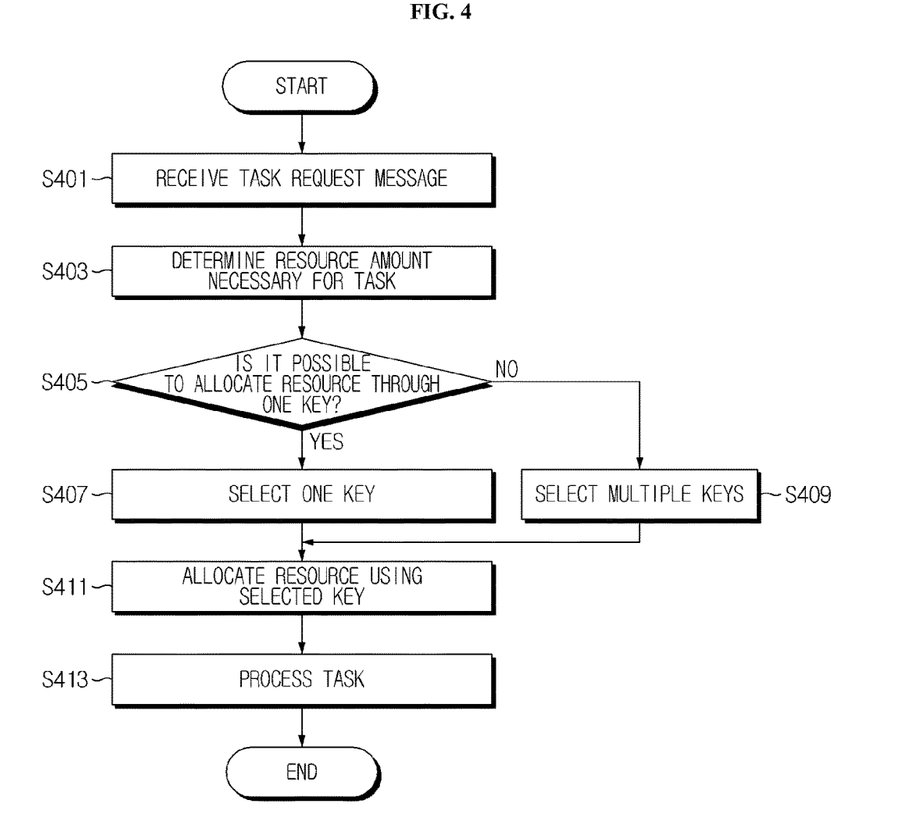
FIG. 4 is a flowchart illustrating a method of allocating a resource to a task requested from a client terminal using multiple cloud API keys in a resource management apparatus according to an exemplary embodiment of the present disclosure.

FIG. 4 is a flowchart illustrating a method of allocating a resource to a task requested from a client terminal using multiple cloud API keys in a resource management apparatus according to an exemplary embodiment of the present disclosure.

As shown in FIG. 4, the transmitting/receiving unit 210 receives a task request message including a task processing command, a storage location of target data, and a storage location of a task processing result from the client terminal 100 (S401).

Subsequently, the task analysis unit 230 analyzes the task requested from the client terminal 100 based on the information included in the task request message and determines a resource amount in the cloud computing system 300 necessary for the task (S403). That is, the task analysis unit 230 identifies a type of the task by analyzing the task processing command included in the task request message and determines a resource amount in the cloud computing system 300 necessary for the task including the number of VMs, an amount of disk space, memory usage, and CPU usage based on the type of the job.

Subsequently, the key selection unit 240 determines whether it is possible to allocate the determined resource amount using one cloud API key, based on data in the key management table (S405). That is, the key selection unit 240 searches for a cloud API key having a resource amount sufficient to allocate the resource amount necessary for the task in the key management table of the storage unit 220.

When it is possible to allocate the determined resource amount through one cloud API key, the key selection unit 240 selects a cloud API key covering the resource amount as a cloud API key of the client terminal 100 (S407).

In contrast, when it is impossible to allocate the determined resource amount through one cloud API key, the key selection unit 240 selects multiple cloud API keys as a cloud API key of the client terminal 100 to cover the resource amount (S409).

For example, when as the resource amount necessary for the task requested from the client terminal 100, the number of VMs is 10 and an amount of disk space is 100 GB according to analysis by the task analysis unit 230 and data in the key management table is as shown in FIG. 3, the key selection unit 240 selects Key1 covering 10 VMs and 100 GB of disk space as a cloud API key of the client terminal 100. As another example, when as the resource amount necessary for the task requested from the client terminal 100, the number of VMs is 20 and an amount of disk space is 150 GB according to analysis by the task analysis unit 230 and data in the key management table is as shown in FIG. 3, the key selection unit 240 determines that it is impossible to allocate the resource amount necessary for the task (i.e., 20 VMs and 150 GB of disk space) through one cloud API key. Then, the key selection unit 240 selects multiple cloud API keys, Key1 and Key2, as a cloud API key of the client terminal 100 for allocation of 20 VMs and 150 GB of disk space.

When the selection of the cloud API key for the client terminal 100 is completed, the key selection unit 240 transmits the selected multiple cloud API keys to the task processing unit 250 to instruct the task processing unit 250 to process the task through the cloud API keys.

Subsequently, the task processing unit 250 is allocated, from the cloud computing system 300, resources corresponding to the resource amount determined by the task analysis unit 230 using the at least one cloud API key transmitted from the key selection unit 240 (S411). That is, when the task processing unit 250 accesses the cloud computing system 300 based on the at least one cloud API key and requests the resource amount necessary for the task (for example, the number of VMs and an amount of disk space) to the cloud computing system 300, resources corresponding to the necessary resource amount are created in the cloud computing system 300 and allocated to the task requested from the client terminal 100 in response to the request. Preferably, when the requested resources are allocated by the cloud computing system 300, the task processing unit 250 updates the key management table of the storage unit 220 to reflect changed information associated with the allocated resource.

Further, the task processing unit 250 extracts information necessary to process the task (i.e., a task processing command, a storage location of target data, and a storage location of a task processing result) from the task request message received from the client terminal 100 and transmits the same to the cloud computing system 300 having allocated the necessary resource amount, in order to process the task requested from the client terminal 100 through the resource in the cloud computing system 300 (S413). That is, the task processing unit 250 transmits information necessary to process the task to the cloud computing system 300. The cloud computing system 300 extracts data (for example, VM, CPU, memory, and disk) from the storage location of target data (for example, Uniform Resource Identifier (URI)) using the allocated resource, analyzes the extracted data through the task processing command, and stores a result of the analysis in the storage location of a task processing result.

When the task processing unit 250 is notified of task processing completion from the cloud computing system 300, the task processing unit 250 transmits a task processing complete message to the client terminal 100 to inform the user of the client terminal 100 that processing of the requested task was completed. Also, when processing of the task is completed on the cloud computing system 300 and the resource allocated to the task is returned, the task processing unit 250 updates data in the key management table of the storage unit 220 to reflect changed information associated with the returned resource.

As described, in response to a request for a task from the client terminal 100, more than one of cloud API keys is selected according to a resource amount necessary for the requested task, and the processing of the task is allowed based on the selected cloud API key in accordance with at least one embodiment. Accordingly, even though a resource limit policy is set to the cloud computing system 300, a large scale task may be processed through the cloud computing system 300. Further, the present disclosure efficiently manages the resources in the cloud computing system 300 by continuously using cloud API keys having available and allocable resource amounts.

Although the foregoing embodiment describes that the resource management apparatus 200 is separate from the cloud computing system 300, it should be understood that the resource management apparatus 200 and the cloud computing system 300 may be integrally formed.

While this specification contains many features, the features should not be construed as limitations on the scope of the disclosure or the appended claims. Certain features described in the context of separate exemplary embodiments can also be implemented in combination in a single exemplary embodiment. Conversely, various features described in the context of a single exemplary embodiment can also be implemented in multiple exemplary embodiments separately or in any suitable subcombination.

Although the drawings describe the operations in a specific order, one should not interpret that the operations are performed in a specific order as shown in the drawings or successively performed in a continuous order, or all the operations are performed to obtain a desired result. Multitasking or parallel processing may be advantageous under a particular environment. Also, it should be understood that all exemplary embodiments do not require the distinction of various system components made in the above mentioned embodiment. The program components and systems may be generally implemented as a single software product or multiple software product packages.

The above mentioned method of the present disclosure may be implemented as program instructions and recorded in non-transitory computer-readable media (such as, for example, a compact disk-read only memory (CD ROM), random access memory (RAM), read-only memory (ROM), floppy disks, hard disks, magneto-optical disks, and the like). This process may be easily performed by person having ordinary skill in the technical field to which the present disclosure belongs, and its detailed description is omitted herein.

It should be noted various substitutions, modifications, and changes may be made to the present disclosure by person having ordinary skill in the technical field to which the present disclosure belongs without departing from the spirit and scope of the present disclosure, and the present disclosure is not limited by the above described embodiments and the accompanying drawings.

What is claimed is:

1. A resource allocation method by a resource management apparatus comprising:
    receiving a request for a task by a receiving unit;
    determining a resource amount necessary for the requested task by a task analysis unit;
    selecting at least one cloud API key from a plurality of cloud API keys for allocation of the determined resource amount by referring to a table including information on an available resource amount and a resource amount being allocated for each of the plurality of cloud API keys provided from the cloud computing system by a key selection unit;
    requesting resource allocation corresponding to the determined resource amount to a cloud computing system using the selected at least one cloud API key by a task processing unit, and being allocated with the requested resources from the cloud computing system and then updating the available resource amount and the resource amount being allocated in the table based on the determined resource amount by a task processing unit; and
    executing the requested task using the allocated cloud resources by the task processing unit.

2. The resource allocation method according to claim 1, wherein the selecting comprises:
    determining whether it is possible to allocate the determined resource amount through one cloud API key by referring to the table; and
    selecting the at least one cloud API key as a cloud API key for allocation of the determined resource amount based on a result of the determination.

3. The resource allocation method according to claim 2, wherein the determining comprises determining at least one of a number of virtual machines, an amount of disk space, Internet Protocol (IP) usage, memory usage, and Central Processing Unit (CPU) usage, as the resource amount necessary for the task.

4. The resource allocation method according to claim 2, wherein the determining comprises analyzing a type of the task, and determining the resource amount necessary for the task based on the analyzed type of the task.

5. The resource allocation method according to claim 1, wherein the determining comprises determining at least one of a number of virtual machines, an amount of disk space, Internet Protocol (IP) usage, memory usage, and Central Processing Unit (CPU) usage, as the resource amount necessary for the task.

6. The resource allocation method according claim 1, wherein the determining comprises analyzing a type of the task, and determining the resource amount necessary for the task based on the analyzed type of the task.

7. The resource allocation method according to claim 1, wherein the determining comprises determining at least one of a number of virtual machines, an amount of disk space, Internet Protocol (IP) usage, memory usage, and Central Processing Unit (CPU) usage, as the resource amount necessary for the task.

8. The resource allocation method according to claim 1, wherein the determining comprises analyzing a type of the task, and determining the resource amount necessary for the task based on the analyzed type of the task.

9. A resource allocation apparatus comprising:
    a storage unit configured to store a table including information on an available resource amount and a resource amount being allocated for each of a plurality of cloud application programming interface (API) keys provided from a cloud computing system;
    a receiving unit configured to receive a request for a task from the client terminal;
    a task analysis unit configured to determine a resource amount necessary for the task;
    a key selection unit configured to search for at least one cloud API key among the plurality of cloud API keys for allocation of the resource amount determined by the task analysis unit in the table of the storage unit and configured to select the found at least one cloud API key as a cloud API key for allocation of the determined resource amount; and
    a task processing unit configured to be allocated with resources corresponding to the determined resource amount from the cloud computing system using the selected at least one cloud API keys and configured to execute the task requested from the client terminal using the allocated resource in the cloud computing system,
    wherein the task processing unit is configured to update the available resource amount and the resource amount being allocated in the table of the storage unit based on the determined resource amount.

10. The resource allocation apparatus according to claim 9, wherein the key selection unit is configured to:
    determine whether it is possible to allocate the determined resource amount through one cloud API key by referring to the table; and
    select the at least one cloud API key as a cloud API key for allocation of the determined resource amount based on a result of the determination.

11. The resource allocation apparatus according to claim 10, wherein the task analysis unit is configured to:
   analyze a type of the task; and
   determine the resource amount necessary for the task based on the analyzed type of the task.

12. The resource allocation apparatus according to claim 10, wherein the task processing unit is configured to update the available resource amount and the resource amount being allocated in when the allocated resources are returned.

13. The resource allocation apparatus according to claim 9, wherein the task analysis unit is configured to:
   analyze a type of the task; and
   determine the resource amount necessary for the task based on the analyzed type of the task.

14. The resource allocation apparatus according to claim 9, wherein the task processing unit is configured to update the available resource amount and the resource amount being allocated in the table of the storage unit when the allocated resources are returned.

\* \* \* \* \*